(12) United States Patent
Gerken

(10) Patent No.: US 11,455,298 B2
(45) Date of Patent: Sep. 27, 2022

(54) GOAL-DIRECTED SEMANTIC SEARCH

(71) Applicant: Parsons Corporation, Centreville, VA (US)

(72) Inventor: Mark Gerken, Colorado Springs, CO (US)

(73) Assignee: PARSONS CORPORATION, Centreville, VA (US)

(*) Notice: Subject to any disclaimer, the term of this patent is extended or adjusted under 35 U.S.C. 154(b) by 437 days.

(21) Appl. No.: 16/723,634

(22) Filed: Dec. 20, 2019

(65) Prior Publication Data

US 2020/0293517 A1    Sep. 17, 2020

Related U.S. Application Data

(63) Continuation-in-part of application No. 16/705,729, filed on Dec. 6, 2019, now abandoned.

(60) Provisional application No. 62/801,954, filed on Feb. 6, 2019.

(51) Int. Cl.
| | |
|---|---|
| *G06F 16/23* | (2019.01) |
| *G06F 16/242* | (2019.01) |
| *G06F 16/2452* | (2019.01) |
| *G06N 5/02* | (2006.01) |
| *G06F 16/901* | (2019.01) |
| *G06K 9/62* | (2022.01) |
| *G06F 16/28* | (2019.01) |

(52) U.S. Cl.
CPC ...... *G06F 16/243* (2019.01); *G06F 16/24522* (2019.01); *G06F 16/288* (2019.01); *G06F 16/9024* (2019.01); *G06K 9/6215* (2013.01); *G06N 5/025* (2013.01)

(58) Field of Classification Search
CPC ............ G06F 16/24522; G06F 16/288; G06F 16/243
See application file for complete search history.

(56) References Cited

U.S. PATENT DOCUMENTS

| | | |
|---|---|---|
| 5,418,951 A | 5/1995 | Damashek |
| 5,752,051 A | 5/1998 | Cohen |
| 5,760,406 A | 6/1998 | Powers |
| 5,968,766 A | 10/1999 | Powers |
| 6,194,731 B1 | 2/2001 | Jeys et al. |
| 6,750,006 B2 | 6/2004 | Powers et al. |
| 7,525,102 B1 | 4/2009 | Henshaw et al. |
| 10,810,193 B1 * | 10/2020 | Subramanya ....... G06F 16/9024 |
| 2002/0065880 A1 | 5/2002 | Hasegawa et al. |
| 2003/0227487 A1 | 12/2003 | Hugh |

(Continued)

OTHER PUBLICATIONS

Applied Optics, "Laser-Induced Breakdown Spectroscopy," (feature issue) Oct. 20, 2003.

(Continued)

*Primary Examiner* — Loc Tran

(74) *Attorney, Agent, or Firm* — Martensen IP; Michael C. Martensen

(57) ABSTRACT

Embodiments of goal-directed semantic search allow a user to discover how one or more entities (organizations, people, events, places, etc.) are related without having to explicitly define multiple queries to discover those relationships. In those cases in which more than one structure could be used, separate hypotheses are generated, one for each such structure or relationship. Hypotheses are scored during the process.

18 Claims, 10 Drawing Sheets

(56) References Cited

U.S. PATENT DOCUMENTS

| | | |
|---|---|---|
| 2004/0175294 A1 | 9/2004 | Ellison et al. |
| 2005/0049986 A1 | 3/2005 | Bollacker et al. |
| 2007/0094325 A1 | 4/2007 | Ih et al. |
| 2007/0255529 A1 | 11/2007 | Biazetti et al. |
| 2007/0260569 A1 | 11/2007 | Biger et al. |
| 2008/0112853 A1 | 5/2008 | Hall |
| 2008/0263137 A1 | 10/2008 | Pattison et al. |
| 2009/0106701 A1 | 4/2009 | Yalamanchi |
| 2009/0210364 A1 | 8/2009 | Adi et al. |
| 2009/0271468 A1 | 10/2009 | Distefano |
| 2009/0287628 A1 | 11/2009 | Indeck et al. |
| 2011/0004446 A1 | 1/2011 | Dorn et al. |
| 2011/0238603 A1 | 9/2011 | People et al. |
| 2011/0270797 A1 | 11/2011 | Adams et al. |
| 2011/0288692 A1 | 11/2011 | Scott |
| 2013/0017523 A1 | 1/2013 | Barborak et al. |
| 2013/0325787 A1 | 12/2013 | Gerken et al. |
| 2014/0072947 A1 | 3/2014 | Boguraev et al. |
| 2018/0349755 A1* | 12/2018 | Gao ..................... G06F 16/243 |

OTHER PUBLICATIONS

Burk, Robin, Mark Davis, Michele Morara, Steve Rust, Alan Chappell, Michelle Gregory, Liam McGrath, and Cliff Joslyn. "Semantic X network analysis for evidence evaluation: The threat anticipation initiative." In IEEE, 2011. (Year 2011) 2011 IEEE Network Science Workshop, pp. 162-166.

Callahan, Alison, Michel Dumontier, and Nigam H. Shah. "HyQue: evaluating hypotheses using Semantic Web technologies." In Journal of biomedical semantics, vol. 2, No. 2, p. S3. Bio Med Central, 2011. (Year: 2011).

Chang, "Orthogonal Subspace Projection (OSP) Revisited: a Comprehensive Study and Analysis," IEEE Trans. Geoscience Remote Sensing 43 (Mar. 2005) pp. 502-518.

Damashek, "Guaging Similarity with n-Grams: Language-Independent Categorization of Text," Science, v. 267, pp. 843-848 (Feb. 10, 1995).

Dudenhoeffer, et al., "CIMS: A Framework for Infrastructure interdfependency Modeling and Analysis." Proceedings of 2006 Winter Simulation Conference. [Online] Downloaded Mar. 13, 2017 http://delivery.acm.org/10.1145/1220000/1218204/p478-dudenhoeffer. pdf?ip=151.207.250.61&id=1218204&acc=ACTIVE%20SERVICE &key=C15944E53.

Existing and Potential Standoff Explosives Detection Techniques, National Research Council (The National Academies Press, Washington DC) 2004.

Ferrucci, David, Eric Brown, Jennifer Chu-Carroll, James Fan, David Gondek, Aditya A. Kalyanpur, Adam Lally et al. "Building Watson: An overview of the DeepQA project" AI magazine 31, No. 3 (2010): 59-79. (Year: 2010).

Frantzeskou, et al., "Identifying Authorship by Byte-Level N-Grams: The Source Code Author Profice (SCAP) Method," International Journal of Digital Evidence, v. 6, No. 1 (2007).

Gerken, "Semantic Graph Tracking and Track Forecasting", ISS Whitepaper, Intelligent Software Solutions, Inc., Jan. 7, 2016.

Gerken, et al., "Situation Awareness Using Heterogeneous Models," Collaborative Technologies and Systems, 2010 International Symposium On, IEEE, Piscataway, NJ, USA, May 17, 2010, pp. 563-572.

Grieve, "Quantitative Authorship Attribution: An Evaluation of Techniques," Literaty and Linquistic Computing, v. 22, pp. 251-270 (Sep. 2007).

Hanser, Thierry, Chris Barber, Edward Rosser, Jonathan D. Vessey, Samuel J. Webb, and Stephane Werner. "Self organising ypothesis networks: a new approach for representing and structuring SAR knowledge." Journal of cheminformatics 6, No. 1 (2014): 21. (Year: 2014).

Harsanyi, et al., "Hyperspectral Image Classification and Dimensionality Reduction: An Orthogonal Subspace Projection Approach," IEEE Trans. Geoscience Remote Sensing 32 (Jul. 1994) pp. 779-785.

Henshaw, et al., "Background Suppression and Agent Detection in Multi-Dimensional Spaces," Conference, Long Beach CA, May 22-25, 2006.

Henshaw, et al., "False Alarm Reduction Algorithms for Standoff Detection," Williamsburg Standoff Detection Conference, Williamsburg VA, Oct. 23-27, 2006.

Henshaw, et al., "Real-time Determination and Suppression of Bio-Aerosol Constituents," Proc. SPIE vol. 6378, 637814 (Oct. 2006).

Jeys, "Aerosol Triggers," New England Bioterrorism Preparedness Workshop (Apr. 3-4, 2002).

Jones, Eric K., Nikolaos Denis, and Daniel Hunter. "Hypothesis management for information fusion." IEEE aerospace and electronic systems magazine 18, No. 6 (2003): 3-8 (Year: 2003).

Keselj, et al., "N-Gram-Based Author Profiles for Authorship Attribution," 2003 Pacific Association for Computational Linguistics.

Keshava, et al., "A Survey of Spectral Unmixing Algorithms," Lincoln Laboratory Journal 14 (2003) p. 55.

Kwan, et al., "A Novel Approach for Spectral Unmixing, Classification, and Concentration Estimation of Chemical and Biiological Agents," IEEE Trans. Geoscience Remote Sensing 44 (Feb. 2006) pp. 409-419.

Lakowicz, Principles of Fluorescence Spectroscopy (Kluwer, New York) 1999.

Manolakis, D., et al., "Hyperspectral Image Processing for Automatic Target Detection Applications," Lincoln Laboratory Journal 14 (2003) p. 79.

McClure, M. Heidi et al.; Association Discovery Framework in WebTAS, Proceedings on the International Conference on Artificial Intelligence; Jan. 1, 2013, Rome, New York.

McCreery, "Spectral Sensing of Bio-Aerosols (SSBA)," available at http://www.darpa.mil/spo/programs/briefing/_SSBA pdf, as accessed on Mar. 27, 2007.

National Geospatial Intelligence Agency, "NGA Analytic Modeling and Model Drive Collection", Mar. 15, 2017 (Unclassified).

Oxley, et al., "Information Forensics and the Art of IUS," Proc. SPIE. 6229, Intelligent Computing: Theory and Applications IV, 622902 (May 5, 2006) doi: 10.1117/12.668378.

Pavlik, Rick et al., "Situation Assessment Using Uncertain Data," AIAA Infortech@aerospace 2010; Apr. 20, 2010, XP055126408, Reston, Virginia.

Pike, William, Richard May, and Alan Turner. "Supporting knowledge transfer through decomposable reasoning artifacts." In 2007 40th Annual Hawaii International Conference on System Sciences (HICSS'07), pp. 204c-204c. IEEE, 2007. (Year: 2007).

Primmerman, "Detection of Biological Agents," Lincoln Laboratory Journal 12 (2000) p. 3.

Roy, Jean. "Towards multiple hypothesis situation analysis." In 2007 10th International Conference on Information Fusion, pp. 1-8. IEEE, 2007. (Year: 2007).

Sharaf, et al., Chemometrics (Wiley & Sons, New York) 1986.

Stephanoua, Harry E., and Andrew P. Sage. "Perspectives on imperfect information processing." IEEE transactions on systems, man, and cybernetics 17, No. 5 (1987): 780-798. (Year: 1987).

Talbot, Patrick J. "Automated discovery of unknown unknowns." In MILCOM 2006-2006 IEEE Military Communications conference, pp. 1-7. IEEE, 2006. (Year: 2006).

Trepagnier, et al., "A Fluorescent Bio-Aerosol Point Detector Incorporating Excitation, Emission, and Lifetime Data," Proc. SPIE vol. 6377, 637708 (Oct. 2006).

Trepagnier, et al., "Principal Component Analysis Incorporating Excitation, Emission, and Lifetime Data of Fluorescent Bio-Aerosols," PhAST Conference, Long Beach CA, May 22-25, 2006.

* cited by examiner

THREE ENTRY POINT ELEMENTS e THAT ARE MEMBERS
OF THE SAME SAMEASCLUSTER C

FRAME F WITH THREE EDGES AND TWO ENTRY POINT CLUSTERS. NOTE THAT EDGES $e_i$ AND $e_j$ SHARE A COMMON OBJECT WHILE EDGES $e_j$ AND $e_k$ SHARE A COMMON SUBJECT

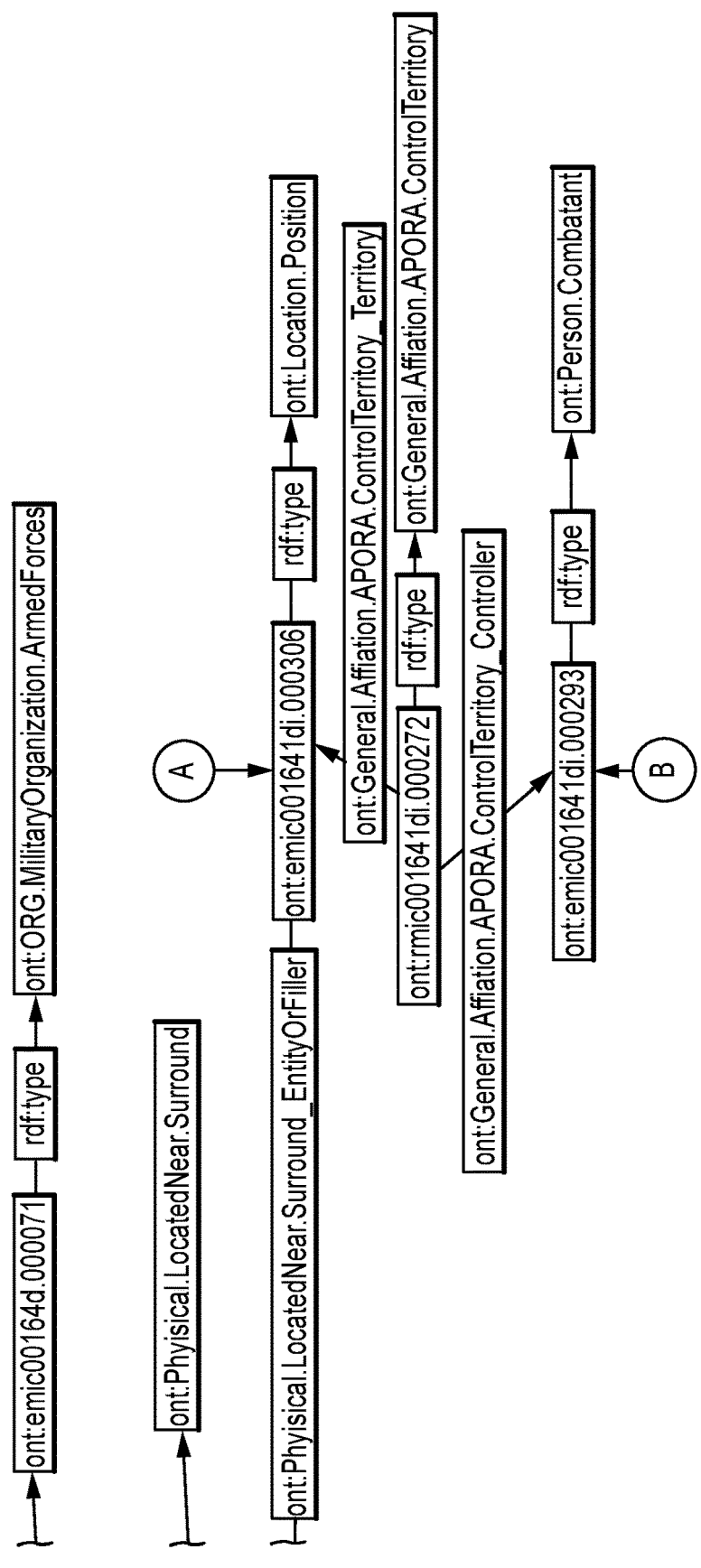
FIG. 8C
CONTINUED FROM FIG.8B

GOAL-DIRECTED SEMANTIC SEARCH

RELATED APPLICATION

The present application relates to and claims the benefit of priority to U.S. Non-Provisional patent application Ser. No. 16/705,729 filed 6 Dec. 2019 and U.S. Provisional Patent Application No. 62/801,954 filed 6 Feb. 2019 which are hereby incorporated by reference in their entirety for all purposes as if fully set forth herein.

STATEMENT REGARDING FEDERAL SPONSORED RESEARCH OR DEVELOPMENT

The U.S. Government has a paid-up license in this invention and the right in limited circumstances to require the patent owner to license others on reasonable terms as provided for by the terms of Contract No. FA8750-18-C-0012 awarded by the United States Air Force Research Laboratory.

BACKGROUND OF THE INVENTION

Field of the Invention

Embodiments of the present invention relate, in general, to non-linear artificial intelligence (AI) reasoning engines and more particularly to those reasoning engines employing semantic knowledge graphing methods and ontologies.

Relevant Background

A "semantic graph" is a common form of AI computer data structure within the broad category of so-called "data graphs" (literally, data, as represented in the form of graphs) that attempts to emulate the way humans think by arranging data in multidimensional neural networks made up of "nodes" (or "vertices") and "links" (or "edges"), rather than by arranging data in computer tables composed of rows and columns. The term, "semantic", simply means, "meaning". Hence, a semantic graph is an AI network that attempts to provide "meaning" to—that is, to "make sense out of"—disparate data. It is this data structure itself that represents the meaning of something expressed through the relationships between nodes and edges. The more efficient structural arrangement of the semantic graph enables much more rapid access to relevant data than from sorting through data presented in tables. Additionally, because of these features semantic graphs are especially useful for deriving usable information from large-volume data stores. A semantic network can have "directed" or "undirected" edges: Directed edges have a direction of information flow associated with them and undirected edges have bidirectional flow.

The core building block of each directed-graph semantic network is a so-called "triple". A "triple", as used in the context of a semantic graph, is simply the trio (hence, "triple") of a subject, a predicate and an object. As an example of a triple, consider the phrase, "John owns a car". In a semantic graph, "John" is the subject; "owns" is the predicate; and "car" is the object. In semantic-graph form, "John" and "car" are represented by nodes and the predicate is represented by the line (or "edge") that links the nodes "John" and "car" together. In this case, because John owns the car and not the other way around, the link is directional as in John $$\text{John} \xrightarrow{\text{owns}} \text{car}.$$

A "knowledge graph" is a particular type of semantic graph in which data is grouped according to ontological relevance—that is, by relational relevance—by showing the relationships between concepts, events or categories, as well as facts about the same, in a particular area of knowledge (sometimes referred to as a "knowledge domain", a "knowledge database" or simply a "knowledge base", abbreviated "KB" for short). A common understanding of this term, "knowledge graph", is that it is a collection of interlinked descriptions of entities—real-world objects, events, situations or abstract concepts. Google, Facebook and Microsoft all operate knowledge graphs as part of their basic infrastructure. Knowledge graphs—like all semantic networks—are dynamic, and although theoretically can grow (with new info) or shrink (with expiration of info), they typically grow, according to new information gained or with new "edges" established between nodes.

Interactions with knowledge graphs are typically executed through use of computer languages tailored to retrieve and manipulate data stored in Resource Description Framework (RDF) format. One such language is "SPARQL" (pronounced "sparkle", a recursive acronym meaning, "SPARQL Protocol and RDF Query Language"). SPARQL is one of a number of a semantic languages used to query, to retrieve information from, to manipulate data in and to populate KBs, all in RDF format. A typical query identifies constraints in the information being sought, identifies one or all of the "knowns"—that is, the known entities and relationships—by names or other unique identifiers, and then passes that information, along with the query itself to a "query engine"—a software "engine" that executes the query. Additional elements can be identified as "optional" items that, while beneficial to narrowing the query, aren't mandatory to the basic inquiry. Once the query is executed, the query engine will then attempt to find the data in the knowledge graph that matches the query. If found, the engine will return the information sought.

A common current approach to querying a knowledge base is a basic semantic query approach. Problems soon arise with a basic semantic query approach, however, because it is inflexible. An example is illustrative: Suppose one poses a query for a "conflict attack" (an event) at Kramatorsk Airport, in Ukraine (a location). Here, a "conflict attack" is a defined term in the query's definition set, and it is also a node in the knowledge graph. A "conflict attack", as defined here, is a both a "conflict" (hostilities, generally) and an "attack" (kinetic or other physically-violent hostilities). Using conventional knowledge-graph methods, the returned data itself might not be able to yield a "conflict attack" because it might be unable to link such an event directly to Kramatorsk Airport. For instance, suppose there was a "conflict", generally, but not a 'conflict attack', per se (i.e., it was a "conflict protest" or a simple "conflict"—again, these would be further-defined terms in this hypothetical example), and while it did not occur at Kramatorsk Airport, it did occur in the city of Kramatorsk, which is right next to Kramatorsk Airport. In this hypothetical example, no information would be returned in the answer to the query for a "conflict attack" at Kramatorsk Airport. Direct query methods attempt to find a match for the query structure provided, and if it can, it builds it in—if it can't, it simply returns an empty, or "null", value.

Query-softening methods attempt to overcome this challenge by "softening"—that is, relaxing—constraints on the query itself. Using the above example, after determining the initial query returns a null response, this query-softening method would rephrase the initial query as, "You are looking for a 'conflict attack' at 'Kramatorsk Airport', but no 'black-and-white' answer matches that search. Instead, let's look for semantically similar things we can find that match the query you've posed." That can include things like searching for a "conflict" instead of a "conflict attack", a "conflict protest" rather than a "conflict attack", or softening the constraint, "Kramatorsk Airport" to include Kramatorsk itself, the city near Kramatorsk Airport, or a host of other query-softening measures. However, these semantically-driven query softening techniques do not return results that match the original query. Instead, they return results that may be "similar" to what was requested. The returned graphs if any, will have the same structure as the original query, but may involve entities, events, or relations that are similar but not identical to the original query. In this example, a query of the form "find conflict-attacks that took place at the Kramatorsk Airport" might return a political protest (rather than a conflict-attack) that took place in the city of Kramatorsk (physically adjacent to the airport). Although query softening of this nature may find some results that are "similar" in an ontological sense to that which were requested by the query, they will not be able to discover results that involve indirect links between the requested element. Answering queries such as "Who violated the agreement concerning the city of Maidan, how was a sniper involved and who was his target?" will require techniques beyond query softening. Current direct query methods to discover a knowledge graph (as later shown and described with reference to the claimed invention) from a KB would require a user to a priori define a query matching the structure of the returned graph. The present invention solves this problem by using a goal-directed graph walking algorithm.

Current methods also attempt to surmount the problem of null returns from rigid queries by exploring directed-graphs (like the knowledge graph discussed here) beyond baseline queries through such techniques as so-called "random walks". A "random walk" engine begins in the knowledge graph at a particular node that has been identified as being "of interest", and builds a solution from that node by randomly selecting an edge to or from that node to find another node, adding that edge and node to the solution. From this "new" node it again picks another random edge to arrive at yet another node, and so on, in iterative fashion. Under conventional random-walk theory, theoretically, if one follows this approach long enough they will eventually arrive at the "answer": The target node or nodes that match the initial query, and the path (or "trajectory" as it is sometimes called) is returned as the data set matching the query. The problem with such techniques is that a lot of extraneous information will be picked up along the way because it is, in fact, a random excursion to find information: Such engines do not necessarily "choose" steps that get any closer to the initial query. That is, new nodes and edges are chosen at random rather than with purpose. A simple analogy to this process may be illustrative. Suppose a driver is attempting to drive from the Denver International Airport to the Bronco's Mile High Stadium. Rather than following even simple guidance such as "head west", a driver executing a random walk algorithm would, at each intersection (choice point), randomly decide whether to turn left, go straight, or turn right. In theory, if the driver drove long enough using this strategy, they would eventually arrive at Mile High Stadium. The same is true for "growing" a solution to a graph query using a random walk algorithm: if a solution exists linking the desired elements together (e.g., the Sniper and the City of Maidan), eventually a graph structure would be created that contained that linkage. However, that approach is impractical for anything beyond "toy" sized KBs.

It is desirable to have a query method and apparatus (query engine or Hypothesis) that can receive natural language queries and interact with a knowledge base in a more intelligent and efficient manner than current methods and return a meaningful answers in less time than current methods.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

FIGS. 8A-8C illustrate a graph structure satisfying the information need illustrated in FIG. 2 according to an embodiment.

Figure 1:
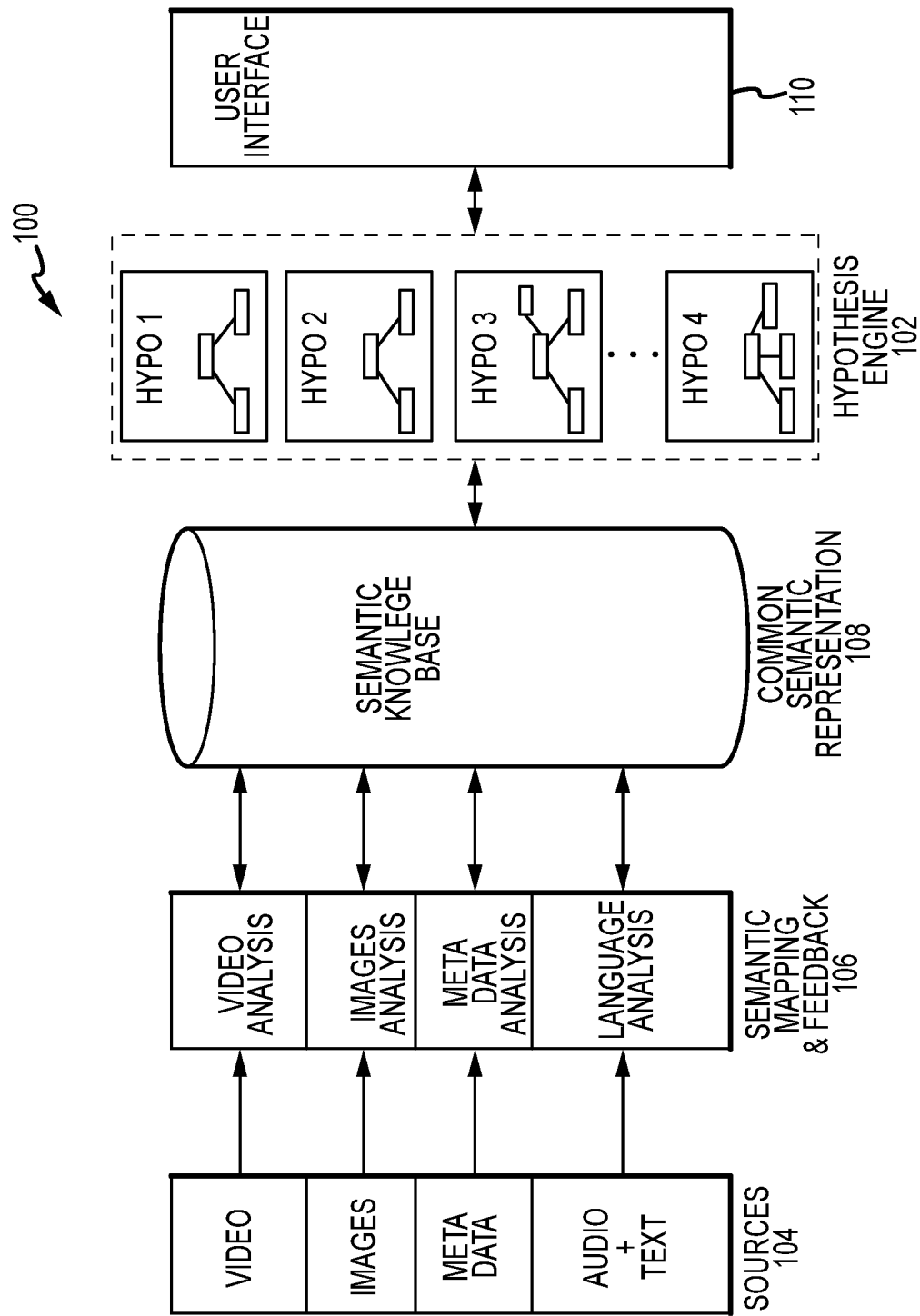
FIG. 1 is a block diagram of a goal-directed semantic search system according to an embodiment.

Features and objects of the present invention and the manner of attaining them will become more apparent, and the invention itself will be best understood, by reference to the following description of one or more embodiments taken in conjunction with the accompanying drawings and figures imbedded in the text below and attached following this description.

The Figures depict embodiments of the present invention for purposes of illustration only. One skilled in the art will readily recognize from the following discussion that alternative embodiments of the structures and methods illustrated herein may be employed without departing from the principles of the invention described herein.

Embodiments of the present invention are hereafter described in detail with reference to the accompanying Figures. Although the invention is described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

DETAILED DESCRIPTION

The present invention allows a user to discover how one or more entities (organizations, people, events, places, etc.) are related without having to explicitly define queries to discover those relationships. In those cases in which more than one structure could be used, this innovative approach creates separate hypotheses, one for each such structure or relationship.

Embodiments of the invention query a knowledge base (KB) that stores many millions of triples, where a triple is a term known in the art. A query includes an information need statement in natural language. An information frame then identifies desired information. A frame may be expressed in application interchange format (AIF). There may be multiple frames per information need statement. Each frame identifies one or more entry points (to the KB). There may be multiple entry points, some of which may be conflicting. For purposes of illustration, consider the information need:

```
<?xml version= "1.0" encoding="UTF-8"?>
<!DOCTYPE information_need SYSTEM "./dtd/information_need.dtd">
<!-- Statement of information neod for topic, R103
Who Started the Shooting at Maidan?
(February 2014)
This SIN expects returned hypotheses to answer the
following Natural language atomic quires:
* Who fired violated the agreement concerning the city "Maidan"
* How was the Sniper involved?
(* starred questions are explicit in the SIN): -->
<information_need id="MAIDAN SHOOTING">
<frames>
<frame id="Frame1">
<edges>
    <!-- Who violated the agreement? -->
    <!-- Bound variable for the Location of
    an agreement violation -->
    <edge id="F1_E1">
        <subject> ?ViolateAgreement1 </subject>
        <predicate> Government.Agreements.
        ViolateAgreement_Place</predicate>
    </edge>
    <!-- Unbound variable for the Violator in the
    violate agreement event1 -->
    <edge id="F1_E2">
        <subject> ?ViolateAgreement1 </subject>
        <predicate> GovernmentAgreements.
```

```
        ViolateAgreement_Violators</predicate>
    </edge>
    <!-- How was the sniper related to the violation ? -->
    <!-- Bound variable (sniper) for the Attacker
    of a firearm attack event1 -->
    <edge id="F1_E3">
        <subject> ?FirearmattackEvent1 </subject>
        <predicate> Conflict.Attack.Firearm-
        Attack_Attacker </predicate>
    </edge>
    <!-- Unbound variable for the Attacker in
    the firearm attack event2 -->
    <edge id="F1_E4">
        <subject> ?FirearmattackEvent1 </subject>
        <predicate> Conflict.Attack.Firearm-
        Attack_Place </predicate>
    </edge>
    <!-- The unbound variable of the Target
    of the firearm attack-->
    <edge id="F1_E5">
        <subject> ?FirearmattackEvent1 </subject>
        <predicate> Conflict.Attack.Firearm-
        Attack_Target </predicate>
        <!-- <objectType> PER.Police </objectType> -->
    </edge>
</edges>
</frame>
</frames>
<--Entrypoints for the above frame(s) -->
<entrypoints>
<entrypoint>
    <node> ?Location1 </node>
    <typed_descriptors>
        <typed_descriptor>
            <enttype> GPE.UrbanArea.City </enttype>
            <string_descriptor>
                <name_string> Maidan</name_string>
            </string_descriptor>
        </typed_descriptor>
    </type_descriptors>
</entrypoint>
<entrypoint>
    <node> ?Sniper1 </node>
    <typed_descriptors>
        <type_descriptor>
            <enttype> PER.Combatant.Sniper </enttype>
            <video_descriptor>
                <doceid>HELIO223 </doceid>
                <keyframeid> FX2_26 </keyframeid>
                <topleft> 0, 0 </topleft>
                <bottomright> 1280, 720 </bottomright>
            </video_descriptor>
        </typed_descriptor>
    </typed_descriptors>
</entrypoint>
</entrypoints>
</information_need>
```

The reference information need contains one frame, identified in the figure as "Frame1". That frame contains four frame edges identified as F1_E1, F1_E2, F1_E3, F1_E4, and F1_E5. Frame edge F1_E1 indicates that a triple involving the predicate "Government.Agreements.ViolateAgreement Place" needs to be included in the solution. Similarly, frame edge F1_E2 indicates that a triple with the same subject as that returned for edge F1_E1 and predicate Government.Agreements.ViolateAgreement_Violator needs to be included in the solution. Frame edges F1_E1 and F1_E2 are defined to share a common subject (in the triple "subject, predicate, object" sense) through the use of a common query variable "?ViolateAgreement1"; note that through the use of "SameAsClusters" (FIG. 2), distinct elements with unique URIs may be considered "the same" provided they are all members of the same SameAsCluster. For example, distinct references to the city Maidan may be extracted from different sources (FIGS. 1, 102 and 106) but grouped in the same SameAsCluster (FIG. 2) as they all refer to the same city. Someone familiar with the current art will recognize the use of a preceding question mark to denote query variables. Similarly, frame edges F1_E3, F1_E4, and F1_E5 seek information about a Conflict.Attack.Firearm_Attack, with F1_E3 seeking the attacker (denoted as "?Sniper1"), F1_E4 the place of the attack, and F1_E5 and the target of the attack (denoted as "?TargetOfAttack1"). Implicit in this structure is the requirement that the solution include KB graph data that links the frame edges together as part of a connected knowledge graph such as the one shown in FIG. 8. The reference information need includes two "entry points" that bind some of the query variables referenced in the frame. Specifically, the query variable "?Location1" is bound to be of type GPE.UrbanArea.City with a name of "Maidan". The query variable "?Sniper1" is bound to correspond to a sniper entity extracted by an external video processing system that extracted a Sniper object from a video with a document identifier of "HELIO223" from a video frame with keyframe identifier of FX2_26. (Extraction of knowledge elements from video, text, and imagery is external to this invention.) As someone familiar with the art can infer, entry points can be defined using other means including document identifiers and offsets indicating the source document and location for the entity, event, or relation extracted from that source; an entity name such as "Maidan", or other identifier such as a universal resource identifier (URI) or similar unique ID.

Embodiments interact with the KB to produce one or more hypotheses as answers(s) to the stated information need. In the process of a goal directed walk of the KB, possible "solutions" are given an overall satisfaction score (e.g., a "cost" score) which guides the goal directed walk and differentiates the invention of the claims from prior art random walk solutions.

FIG. 1 is a block diagram of an embodiment of a goal-directed semantic search system 100 according to an embodiment. Sources 104 include multiple types of data in various formats. As shown, sources 104 include video data, still image data, meta data and audio and text data. The "raw" data from sources 104 is received by semantic mapping and feedback element 106. Element 106 analyzes each type of data and standardizes the collective data into a common format including source pedigree, extraction confidence, and other meta data before passing the standardized data to semantic knowledge base (KB) 108, which in this embodiment is also referred to as a semantic KB and stores a common semantic representation of the original input data 104. In an embodiment, KB 108 is a very large graph data structure.

Hypothesis engine 102 receives queries from user interface (UI) 110 and interacts with the common format data in KB 108 to generate one or more hypothetical solutions (as shown). Hypothesis engine 102 includes one or more processors (not shown) that communicate with both UI 110 and KB 108 by any of the commonly used electronic communication method, such as internet, local area network (LAN) and wide area network (WAN), etc. Engine 102 also includes data storage devices and/or facility that is devoted to engine 102. This includes local physical storage, cloud storage, etc.

In an embodiment, a query sent to KB 108 by engine 102 is an information statement as follows;

```
<entrypoint>
   <node> ?E0632 </node>
```

```
   <typed_descriptor>
      <enttype> Person </enttype>
      <string descriptor>
         <name_string>сепаратистов </name_string>
      </string_descriptor>
   </typed_descriptor>
</entrypoint>
<frames>
   <frame id=" Q002_F1">
      <edges>
         <edge id=" Q002_F1_E1">
            <subject> ?transactionEvent </subject>
            <predicate>Transaction.Transfer-Ownership_Giver </predicate>
            <object> ?giver </object>
         </edge>
         <edge id=" Q002_F1_E2">
            <subject> ?transactionEvent </subject>
            <predicate>Transaction.Transfer-Ownership_Recipient </predicate>
            <object> ?E0632 </object>
         </edge>
         <edge id=" Q002_F1_E3">
            <subject> ?transactionEvent </subject>
            <predicate>Transaction.Transfer-Ownership_Thing </predicate>
            <object> ?transferedThing </object>
            <objectType> Weapon </objectType>
         </edge>
         <edge id=" Q002_F1_E4">
            <subject> ?transactionEvent </subject>
            <predicate> Transaction.Transfer-Ownership_Place </predicate>
            <object> ?E0626 </object>
         </edge>
      </edges>
   </frame>
```

The triple is evident as subject, predicate, and object.

Figure 2:
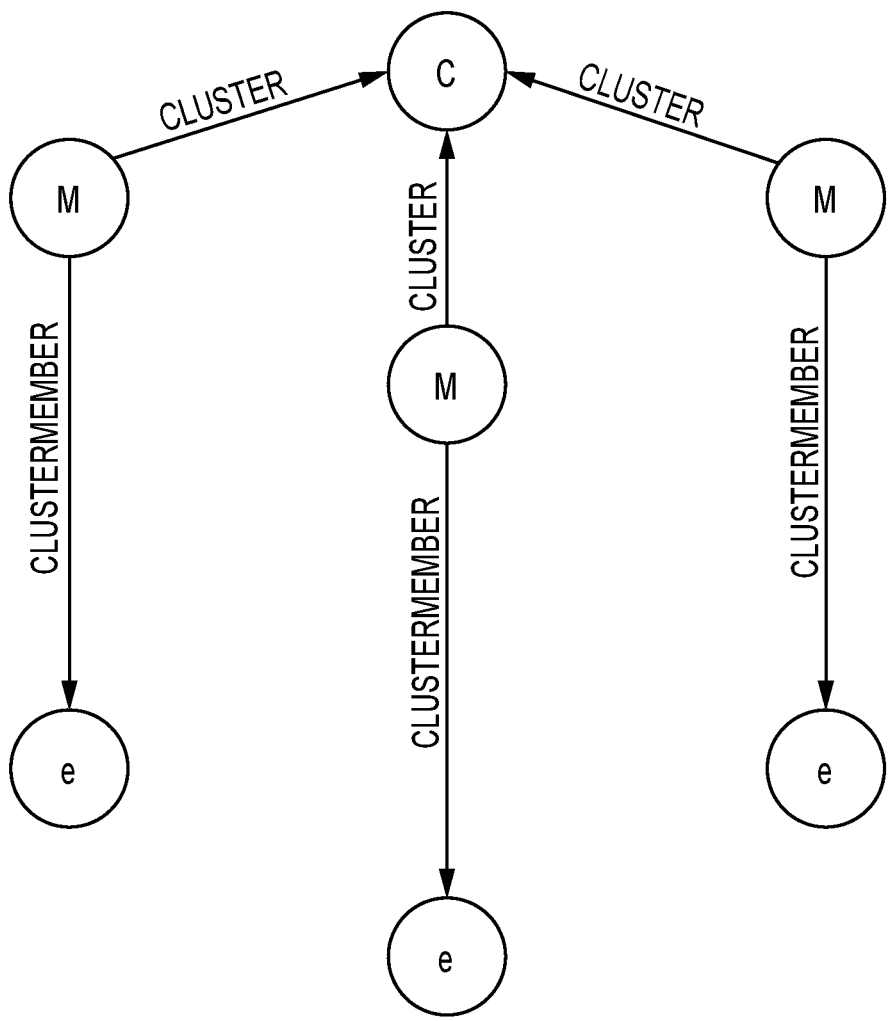
FIG. 2 is an illustration of multiple independently extracted elements (i.e., entities, events, or relations) identified as being equivalent or "same as" other elements in that cluster according to an embodiment.

Referring to FIG. 2, entry points to KB 108 are further described. An information need may have several entry point which may or may not be part of the same "SameAsCluster" (cluster). Similar entry points are collapsed into a singular prototypical element for those points.

Given an Information Need I and collection entities e corresponding to the entry points in I:

$$E_C = U_{e \in r}[e] \exists\, i(e \xleftarrow{\text{clusterMember}} M_s \xrightarrow{\text{cluster}} C)\}$$

where M is ClusterMembership relation and C is a SameAsCluster class instance.

In an embodiment, all entities $e \in E_C$ equivalently: any edge inbound our outbound on an entity $e \in E_C$ will be considered to exist on any other entity $e \in E_C$.

Figure 3:
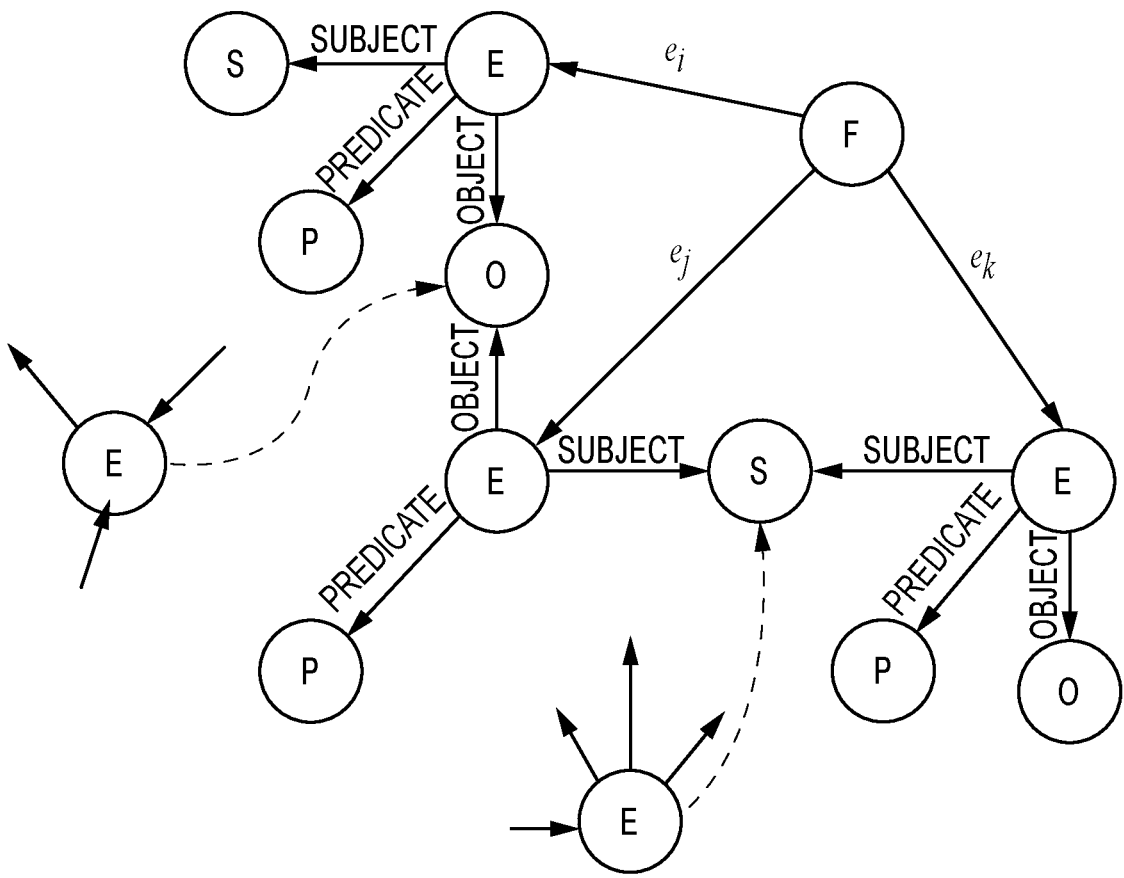
FIG. 3 is a diagram illustrating a target subgraph defined by a frame.

Referring to FIG. 3, subgraphs within the KB 108 are targeted as being defined by a frame. Each frame F in an information need I defines a subgraph $\Gamma_F$ of desired information.

Each edge structure of the frame defines a target consisting of a <subject, predicate, object>triple.

F also identifies which entry points if any correspond to specific edge structure elements.

The goal is to find a path between entry point clusters $E_C$ and individual target elements defined by the frame F (shown by the dashed lines in the figure) to return a connected graph in which a path exists in the result that connects any pair of frame edges.

Figure 4:
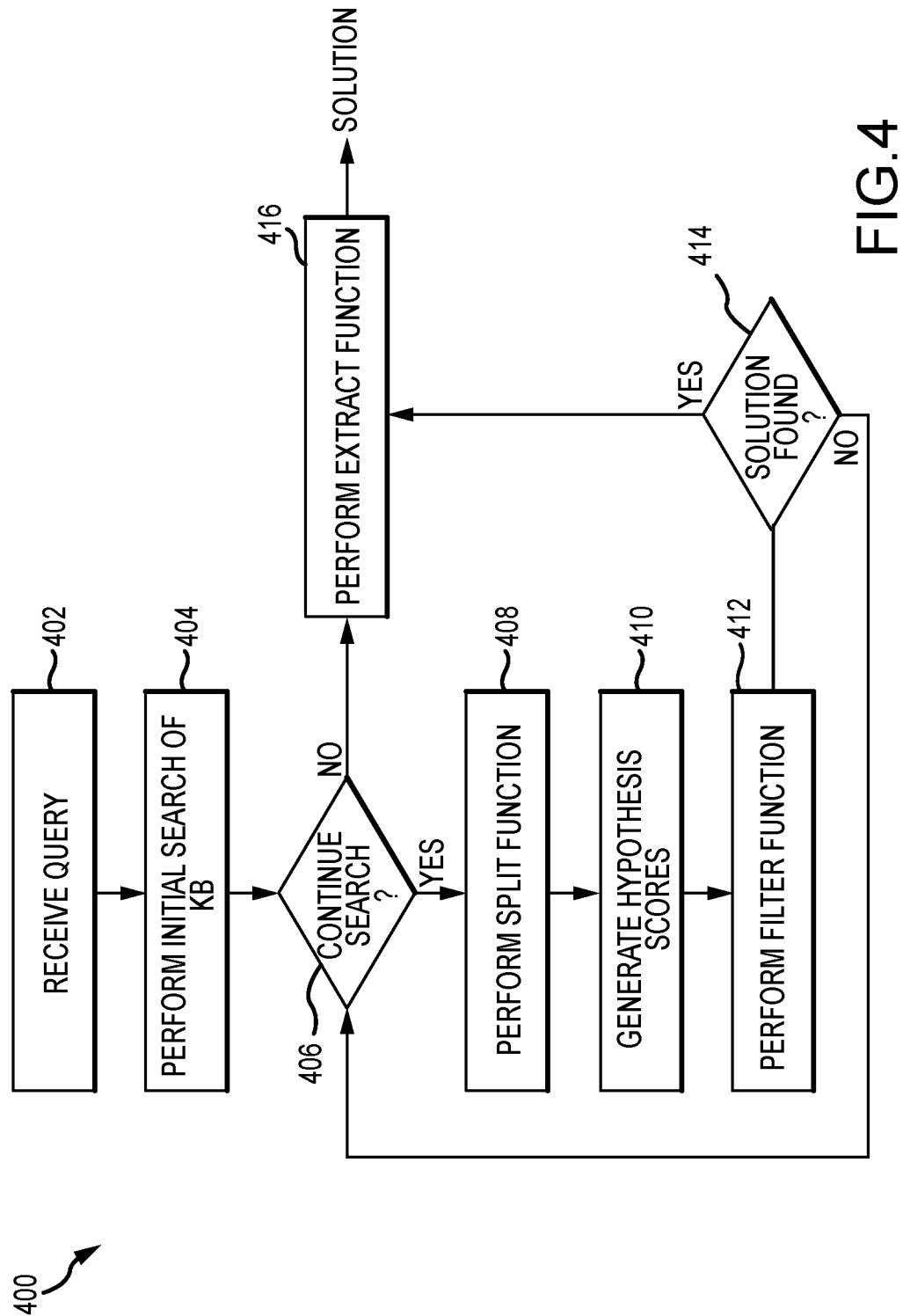
FIG. 4 is a flow diagram illustrating a process of querying a knowledge base according to an embodiment.

FIG. 4 is a flow diagram illustrating a process of querying a KB. At 402 query is received by engine 102. An initial search is performed at 404. This search seeks information from the KB that satisfies the conditions expressed by the frame edge entry points. Note that 404 may result in the creation of multiple competing hypotheses. In contrast to a true random walk, the present invention will explore multiple possibly thousands of hypotheses in parallel (102). At 406, a check is performed as to whether the search for a solution should be continued. In one embodiment, this check may involve limiting the recursion depth, maximum path length of any given hypothesis, total computation time expended so far, or some other heuristic or rule-based termination condition. If the result of the check is no, the partial solution as represented by a collection of the highest scoring hypotheses (102) are passed to the Extract Function at 416; the number passed in this manner in one embodiment is under user control. If the result of the continuation check is yes, a split function is performed at 408. Each hypothesis generated from the split operation is scored at 410. At 412, a filter function is performed. At 414 the hypotheses surviving the filter of 412 are checked to see if they satisfy a solution predicate. If the answer is yes, at 416 an extract function is performed. If the answer is no, all partial solutions surviving the filter are added to the set of hypotheses 102 and the process continues at 406 to see if the search should continue.

At 410, a satisfaction or cost score is generated based on the previous functions; also referred to as "scoring".

The specific elements of the flow diagram of FIG. 4 are described in more detail below.

Figure 5:
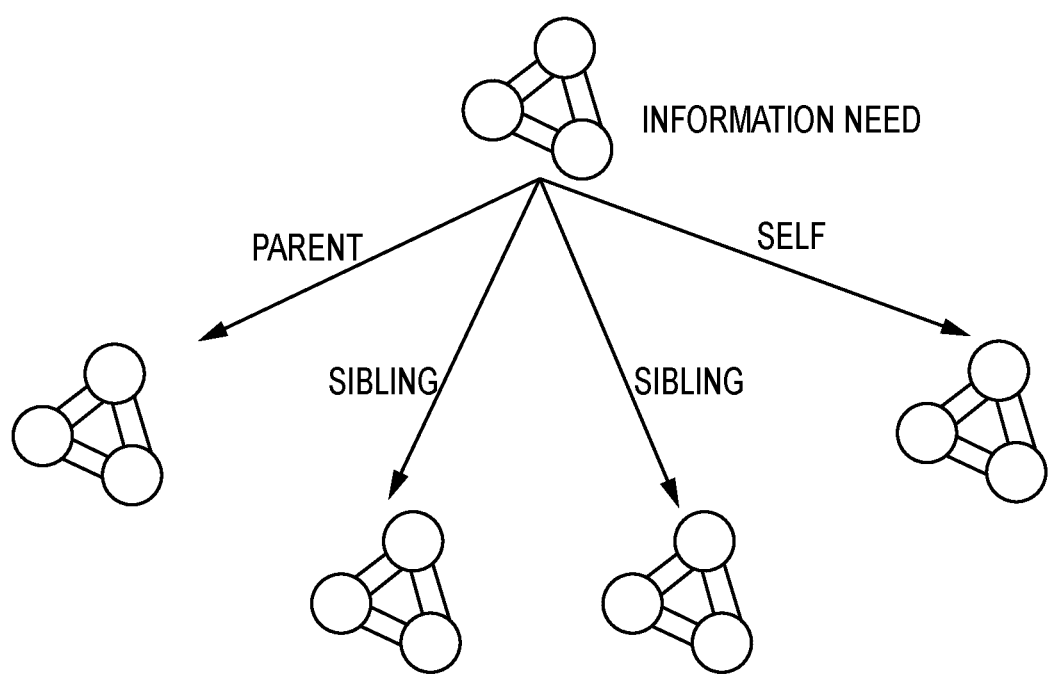
FIG. 5 illustrates an information need and relationships between the information need, a parent, self, and two siblings.

Referring to FIGS. 5-10, a search algorithm of one embodiment is described in further detail. FIG. 5 illustrates an information need and relationships between the information need, an ontological or taxonomical parent, self, and two ontological or taxonomical siblings (all of the aforementioned being triples). In an embodiment, given an input X, rather than applying class relaxation on the initial search space, the relaxation can be applied to the information need structure. This simplifies a softening process and may increase potential matching entry points against related classes. For purposes of illustration, in one embodiment the ontological parent of Conflict.Attack.FirearmAttack is Conflict.Attack while a sibling could be Conflict.Attack.NonleathalWeaponAttack.

Figure 6:
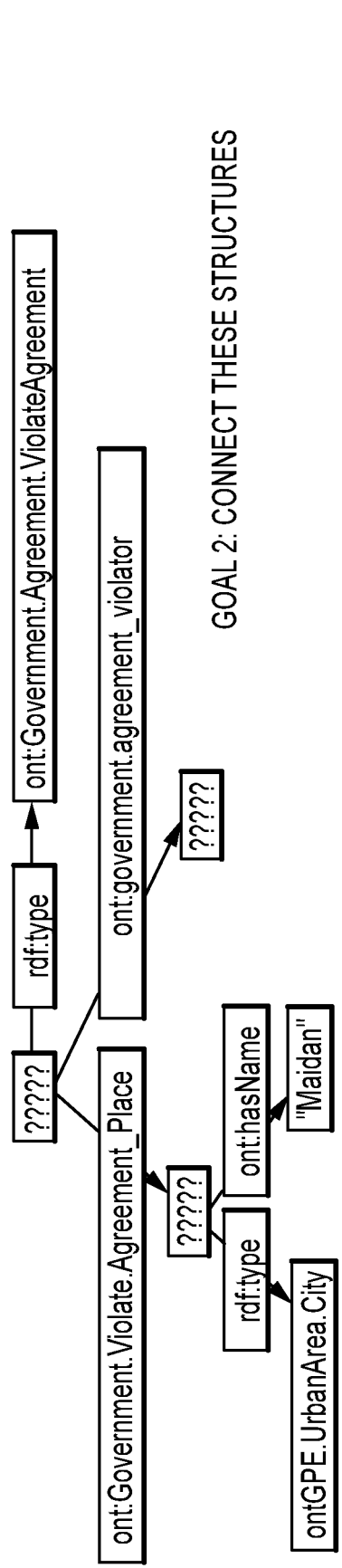
FIG. 6 shows an initial search space that has been populated according to an embodiment. Note that in the figure, those structures marked with "?????" indicate structures sought via direct query. Those structures labeled "A" such as ont:Government.Agreement.ViolateAgreement correspond to elements extracted from an information illustrated in FIG. 3.
Figure 6:
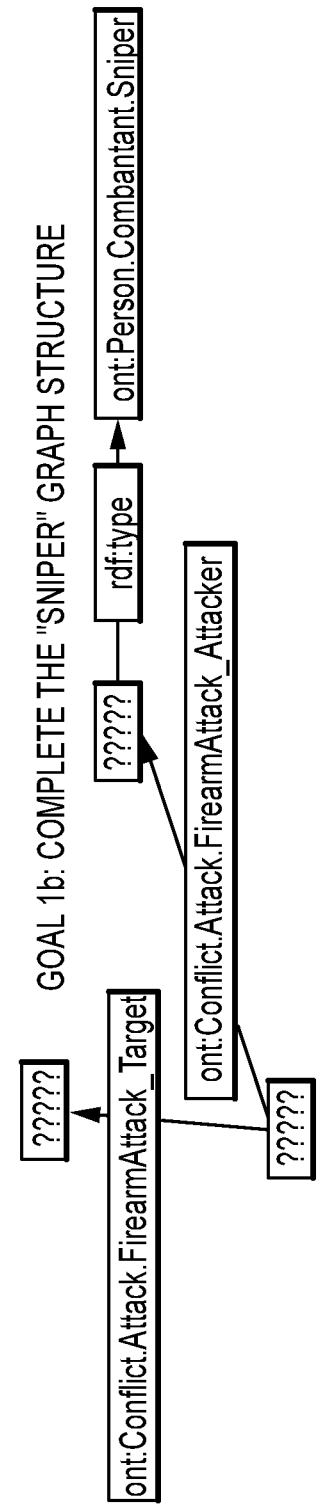

FIG. 6 shows a graph query structure extracted from the information need as previously described.

Figure 7:
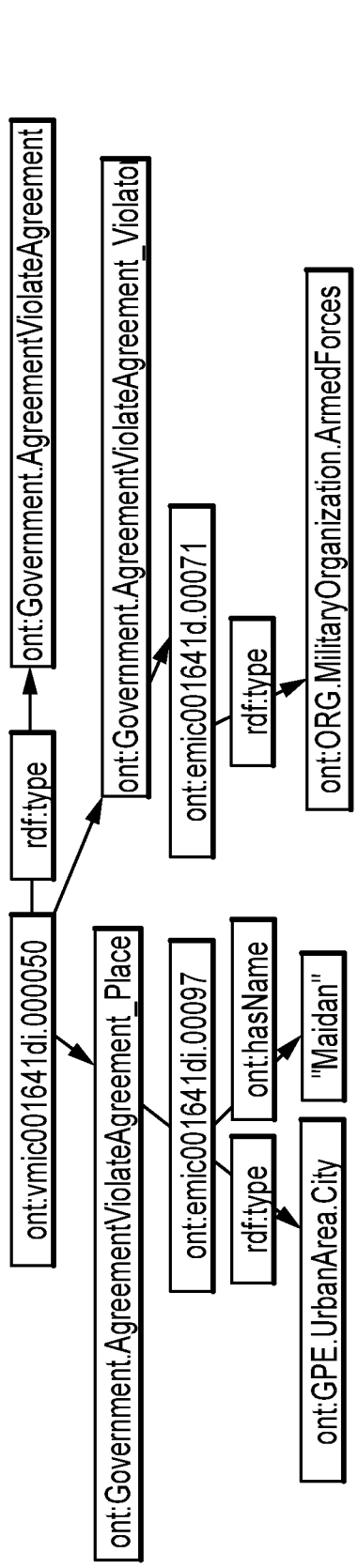
FIG. 7 illustrates an initial solution space populated with graph structures queried from the KB according to an embodiment.
Figure 7:
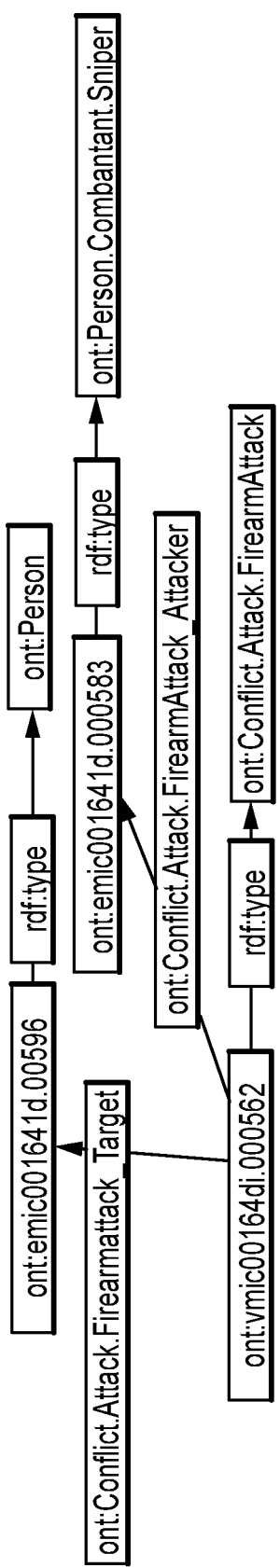

FIG. 7 shows an initial search space that has been populated as previously described.

Figure 8A:
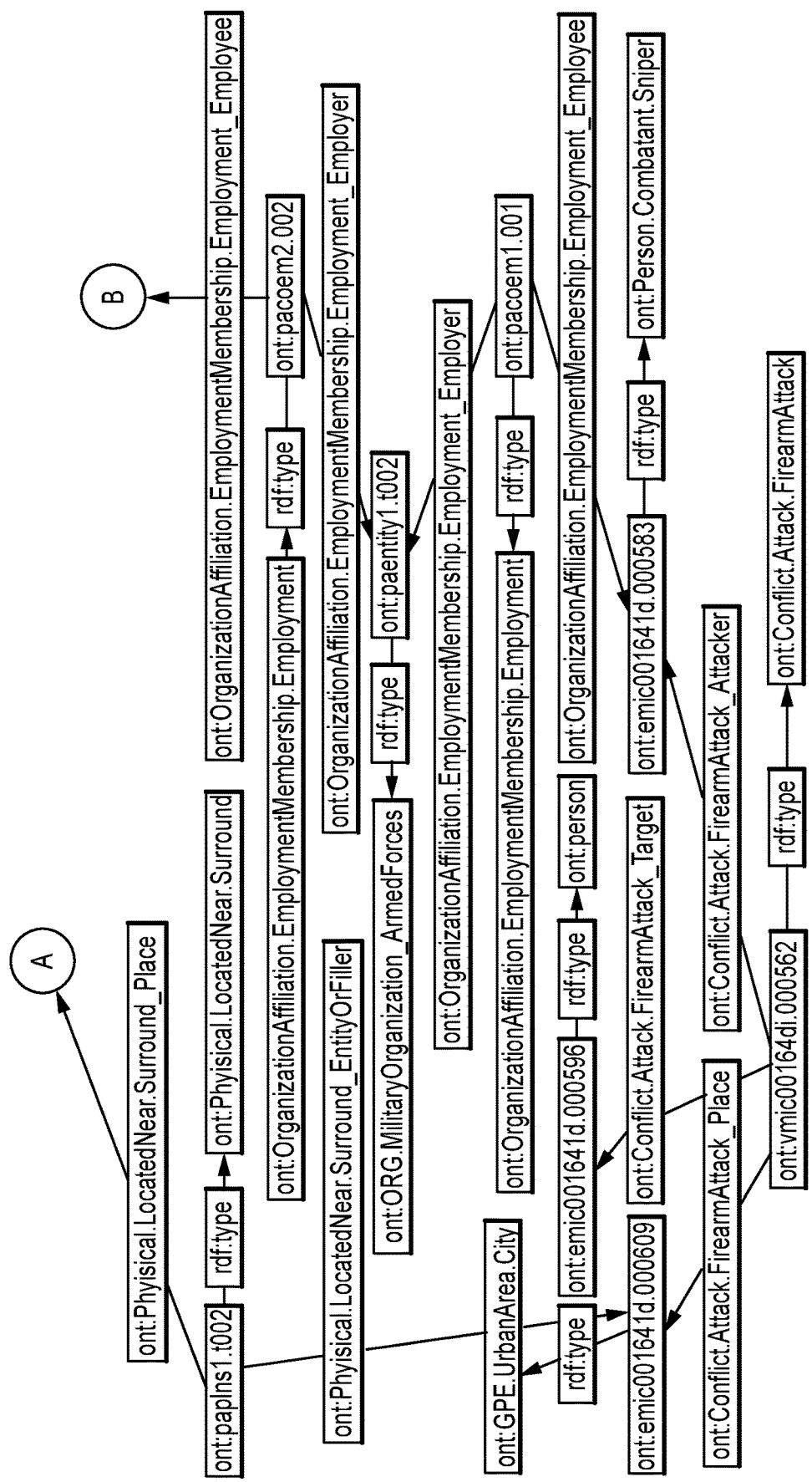
Figure 8B:
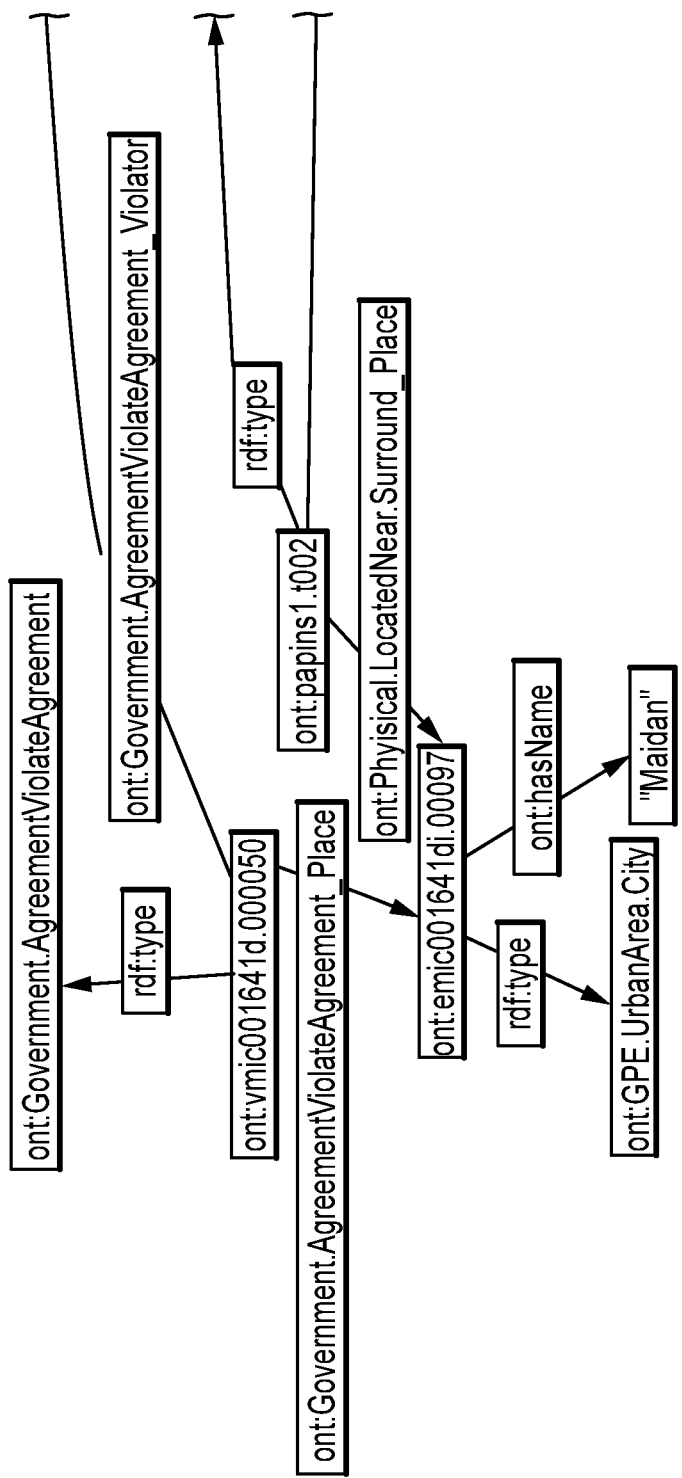

FIGS. 8A-8C show a possible solution to a query. Note that all information requested by the information need frame edges and matching entry points can be found in the graph and that paths exist in the graph from any frame edge triple to any other frame edge triple.

In embodiments of the invention, other operations are performed, including:
 Considering graph size and penalizing large graphs;
 Eliminating inconsistent solutions;
 Considering relevance of solutions;
 Generating a confidence score and eliminating low confidence partial solutions. In the present invention, each triple may have a confidence score associated with it indicating the degree of belief in the information represented by that triple.

An embodiment uses a weight vector to create a singular, unified score created by forming a weighted sum of the score elements described above.

Extracting involves consideration of completeness and connectedness.

In an embodiment, an initial search space function may be defined as:
 $\hat{r}_0(x)$: returns a set of graphs $\mathcal{G}$ and a map of scores score(x, g)$\rightarrow \mathcal{R}$ where each graph g $\in \mathcal{G}$ is defined by one of the following:
  Direct query of the information need x entry points P to define a set of data graphs $\mathcal{P}$
  Direct query of the information need frame against the KB using $\mathcal{P}$
  Direct query of the information need frame parent classes against the KB using $\mathcal{P}$
  Direct query of the information need frame sibling classes against the KB using $\mathcal{P}$
A scoring function may be defined as
 score(x, g)$\rightarrow \mathcal{S}$ takes as input an information need x and a hypothesis graph g and returns a score consisting of the following elements
  Consistency
  Graph size (smaller solutions are preferred)
  Semantic distance between classes of g and those requested by x
  Relevance
  Completeness
  Confidence as aggregated across all triples in g
In the scoring function, Score elements can be represented using a vector $\vec{S}$.

In an embodiment, a consistency score of 1 is used provided the information in the KB is consistent. If the data in the KB may be inconsistent, an embodiment supports the use of a consistency function in which 1 is returned if the graph g is self-consistent, 0 if the graph g is inconsistent, and a value between 0 and 1 if the graph g contains information that may be considered implausible under some condition(s).

Smaller graphs are favored over larger graphs.

The semantic distance score may be computed when the frame is first "softened" to parent and sibling classes For relevance it is possible in an embodiment to consider a metric such as the following which measures the relative degree to which the graph g contains information directly related to the information need (IN)

$$\frac{\text{number of graph elements directly matching the } IN}{\text{total graph size}}$$

where total graph size is defined as the sum of the number of nodes and edges the graph.

Completeness metric may be defined as $$\frac{\text{number resolved } IN \text{ constraints}}{\text{number of } IN \text{ constraints}}$$

Confidence may be computed from confidence scores recorded in the datagraph elements. In one embodiment, an averaging function may be used.

All of the above can be combined into a single score by computing the dot product of $\vec{S}$ with a weight vector $\vec{W}$ where $\vec{W}$ defines the relative significance of each element in $\vec{S}$.

In an embodiment, a split function is defined as:
 split(x, $\hat{r}$)$\rightarrow \hat{R}$ which takes as partial solution $\hat{r}$ and knowledge graph x from the KB and creates zero or more children by "gluing" one-hop graph structures $g_i$ from x onto the partial solution $\hat{r}$. In one embodiment, x may represent the knowledge base KB 108. A one-hop structure connects a subject to an object via a predicate. For example, in FIG. 8, entity ont:vmic00164di,000562 is one-hop connected to entity ont:emic001641d.000583 via the predicate ont:Conflict.Attack.FirearmAttack_Attacker.

In one embodiment, hypotheses (distinct partial solutions) are sorted by composite score and only those hypotheses with the highest scores (or, conversely, lowest cost depending on the polarity of the scoring function) are selected for splitting. Poorly scoring hypotheses may be eliminated from further consideration depending on implementation.

Note that due to the algorithm flow 400, the Solution Found check 414 implies that the algorithm will not split partial solutions from which solutions have been directly extracted Application of split 408 may result in a large number of children. In one embodiment, a technique called "beam search" may be used to control the number of active hypotheses under consideration. As one familiar with the art may surmise, given a beam width $b_w$, application of the split operation 408 is limited to no more than $b_w$ of the best scoring hypotheses from the set of active hypotheses 102. In another embodiment, a further restriction on the number of children allowed to be created from any one input graph $\hat{r}$ may be imposed. In another embodiment, a set of heuristic rules may be used to guide the construction of child solutions from a parent $\hat{r}$. For purposes of illustration, one such rule may indicate adding a 1-hop construct involving an employment relation involving an entity in $\hat{r}$ may be preferable to adding a spatial relation involving two UrbanArea.City instances.

In an embodiment, an extract function is defined as:
extract(x,$\hat{r}$)→R which takes as partial solution $\hat{r}$ and directly extracts a solution from it. This function converts a solution $\hat{r}$ from internal to external representation.

It is ideal to extract a solution when "completeness" is 1. Practically, a solution is usually extracted when completeness is above a predefined threshold, and/or when a predefined number of split operations have been completed. In one embodiment, a completeness score of 1 indicates that there is a path from any frame edge triple to any other frame edge triple in the partial solution and for which every frame edge in the information need is represented in the partial solution.

According to an embodiment, a filter function is defined as:
$\Phi$(x, $\hat{r}$)→Boolen takes as partial solution f and returns true if and only if the partial solution may possibly yield a solution through further application of Split. In one embodiment, the filter operation may be softened to also eliminate partial solutions with low confidence scores.

The terms and words used in the foregoing description are not limited to the bibliographical meanings, but, are merely used by the inventor to enable a clear and consistent understanding of the invention. Accordingly, it should be apparent to those skilled in the art that the description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath"

other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to conduct a goal-directed semantic search. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which will be set forth in the forthcoming claims.

What is claimed is:

1. A system for querying a semantic knowledge base (KB), the system comprising:
    at least one processor configured to communicate with the semantic KB,
    data storage capability devoted to the system;
    wherein the at least one processor executed a query method for querying the semantic KB knowledge base, the method comprising,
        receiving a natural language query;
        performing an initial search of the semantic KB;
        based on results of the initial search, performing a split function which employs a goal-directed graph walk algorithm to create candidate solutions (hypotheses) which go beyond a structure defined by the natural language query, wherein the goal-directed graph walk algorithm creates a separate candidate solution for each possible entity relationships without explicitly defining queries to discover those relationships;
        using results from the split function, performing a filter function wherein the filter function takes candidate solutions and returns true when, and only when, a candidate solution within the candidate solutions yields an extracted solution through further application of the split function;
        using results from the filter function, performing an extract function; and
        generating a score for each search result and returning at least one search result.

2. The system for querying a semantic knowledge base according to claim 1, wherein the split function takes one of the candidate solutions and a knowledge graph from the semantic KB and creates zero or more children (solutions) using a one-hop graph structure from the knowledge graph onto the partial solution.

3. The system for querying a semantic knowledge base according to claim 2, wherein the one-hop graph structure connects a subject to an object via a predicate.

4. The system for querying a semantic knowledge base according to claim 2, wherein a set of heuristic rules guides creation of the children (solutions) from the candidate solutions.

5. The system for querying a semantic knowledge base according to claim 1, wherein the filter function is a Boolean operation.

6. The system for querying a semantic knowledge base according to claim 1, wherein the extract function extracts a solution when a measure of completeness is above a pre-defined threshold and when a pre-defined number of split-operations have been completed.

7. The system for querying a semantic knowledge base according to claim 6, wherein the measure of completeness is a measure that there a path from a frame edge triple to any other frame edge triple in the candidate solution and for which every frame edge in the natural language query is represented in the candidate solution.

8. The system for querying a semantic knowledge base according to claim 1, wherein the extract function converts the one or the candidate solutions from internal representation to external representation.

9. The system for querying a semantic knowledge base according to claim 1, wherein the score is a weighted score based on a series of elements selected from the group consisting of consistency, graph size, semantic distance between classes, relevance, completeness and aggregate confidence.

10. A method for querying a semantic knowledge base (KB), wherein the semantic KB is in communication with one or more processors configured to execute instructions stored on a non-transitory storage medium, the method comprising,
receiving a natural language query;
performing an initial search of the semantic KB;
based on results of the initial search, performing a split function which employs a goal-directed graph walk algorithm to create candidate solutions (hypotheses) which go beyond a structure defined by the natural language query, wherein the goal-directed graph walk algorithm creates a separate candidate solution for each possible entity relationships without explicitly defining queries to discover those relationships;

using results from the split function, performing a filter function, wherein the filter function takes candidate solutions and returns true when, and only when, a candidate solution within the candidate solutions yields an extracted solution through further application of the split function;
using results from the filter function, performing an extract function; and
generating a score for each search result and returning at least one search result.

11. The method for querying a semantic knowledge base according to claim 10, wherein the split function takes one of the candidate solutions and a knowledge graph from the semantic KB and creates zero or more children (solutions) using a one-hop graph structure from the knowledge graph onto the partial solution.

12. The method for querying a semantic knowledge base according to claim 11, wherein a set of heuristic rules guides creation of the children (solutions) from the candidate solutions.

13. The method for querying a semantic knowledge base according to claim 10, wherein the filter function is a Boolean operation.

14. The method for querying a semantic knowledge base according to claim 10, wherein the extract function considers completeness and connectedness of candidate solutions.

15. The method for querying a semantic knowledge base according to claim 14, wherein the extract function extracts a solution when completeness is above a predefined threshold and when a pre-defined number of split-operations have been completed.

16. The method for querying a semantic knowledge base according to claim 14, wherein completeness is a measure that there a path from a frame edge triple to any other frame edge triple in the candidate solution and for which every frame edge in the natural language query is represented in the candidate solution.

17. The method for querying a semantic knowledge base according to claim 10, wherein the extract function converts the one or the candidate solutions from internal representation to external representation.

18. The method for querying a semantic knowledge base according to claim 10, wherein the score is a weighted score based on a series of elements selected from the group consisting of consistency, graph size, semantic distance between classes, relevance, completeness and aggregate confidence.

* * * * *